US012605677B2

(12) United States Patent
Nakatsuji et al.

(10) Patent No.: US 12,605,677 B2
(45) Date of Patent: Apr. 21, 2026

(54) METHOD FOR ANALYZING COMPOSITE SEMIPERMEABLE MEMBRANE

(71) Applicant: Toray Industries, Inc., Tokyo (JP)

(72) Inventors: Koji Nakatsuji, Iyo-gun (JP); Kazuya Sugita, Iyo-gun (JP); Hiroo Takabatake, Otsu (JP)

(73) Assignee: Toray Industries, Inc., Tokyo (JP)

( * ) Notice: Subject to any disclaimer, the term of this patent is extended or adjusted under 35 U.S.C. 154(b) by 325 days.

(21) Appl. No.: 18/276,729

(22) PCT Filed: Jan. 28, 2022

(86) PCT No.: PCT/JP2022/003450
§ 371 (c)(1),
(2) Date: Aug. 10, 2023

(87) PCT Pub. No.: WO2022/181211
PCT Pub. Date: Sep. 1, 2022

(65) Prior Publication Data
US 2024/0123408 A1     Apr. 18, 2024

(30) Foreign Application Priority Data

Feb. 26, 2021     (JP) ................................. 2021-029597

(51) Int. Cl.
| | |
|---|---|
| *B01D 65/10* | (2006.01) |
| *B01D 69/12* | (2006.01) |
| *B01D 71/56* | (2006.01) |
| *G01N 21/64* | (2006.01) |
| *G01N 21/95* | (2006.01) |

(52) U.S. Cl.
CPC ............. *B01D 65/10* (2013.01); *B01D 69/12* (2013.01); *B01D 71/56* (2013.01); *G01N 21/64* (2013.01); *G01N 21/95* (2013.01)

(58) Field of Classification Search
CPC ......... G01N 21/00; G01N 21/62; G01N 21/63
See application file for complete search history.

(56) References Cited

U.S. PATENT DOCUMENTS

| | | | |
|---|---|---|---|
| 4,960,711 A | 10/1990 | Aoki et al. | |
| 5,094,817 A | 3/1992 | Aoki et al. | |
| 2012/0112097 A1 | 5/2012 | Lee et al. | |
| 2013/0075331 A1 | 3/2013 | Peiris et al. | |
| 2013/0126754 A1* | 5/2013 | Kim ....................... | G01N 21/64 |
| | | | 250/459.1 |

FOREIGN PATENT DOCUMENTS

| | | | | |
|---|---|---|---|---|
| JP | 61284662 A | | 12/1986 | |
| JP | 02145961 A | | 6/1990 | |
| JP | 2016010771 A | * | 1/2016 | |
| JP | 2016107235 A | | 6/2016 | |
| JP | 2020060456 A | | 4/2020 | |

OTHER PUBLICATIONS

Antony et al., "Assessing the oxidative degradation of polyamide reverse osmosis membrane—Accelerated ageing with hypochlorite exposure", Journal of Membrane Science 347, 2010, pp. 159-164.
International Search Report and Written Opinion for International Application No. PCT/JP2022/003450, dated Mar. 29, 2022, 5 pages.

* cited by examiner

*Primary Examiner* — Ryan B Huang
(74) *Attorney, Agent, or Firm* — Buchanan Ingersoll & Rooney PC

(57) ABSTRACT

The present invention provides a method for analyzing a halogenated structure in a composite semipermeable membrane. The method for analyzing a composite semipermeable membrane according to the present invention includes: a step A for immersing the composite semipermeable membrane in a solution containing alkali and at least one of nicotinamide and a derivative thereof; and a step B for performing fluorescence analysis on the solution obtained in step A.

7 Claims, No Drawings

METHOD FOR ANALYZING COMPOSITE SEMIPERMEABLE MEMBRANE

CROSS REFERENCE TO RELATED APPLICATIONS

This application is the U.S. National Phase of PCT/JP2022/003450, filed Jan. 28, 2022 which claims priority to Japanese Patent Application No. 2021-029597, filed Feb. 26, 2021, the disclosures of these applications being incorporated herein by reference in their entireties for all purposes.

FIELD OF THE INVENTION

The present invention relates to a method for analyzing a composite semipermeable membrane useful for selective separation of a liquid mixture.

BACKGROUND OF THE INVENTION

There are various techniques for removing substances (for example, salts) dissolved in a solvent (for example, water) in relation to separation of a mixture, and in recent years, membrane separation methods have been widely used as processes for energy saving and resource saving. Membranes used in the membrane separation methods include microfiltration membranes, ultrafiltration membranes, nanofiltration membranes, reverse osmosis membranes, and the like, and separation membrane elements using these membranes are used, for example, in obtaining drinking water from seawater, brackish water, water containing harmful substances, and the like, or in the production of industrial ultrapure water, drainage treatment, recovery of valuable substances, and the like.

Most of reverse osmosis membranes and nanofiltration membranes that are currently commercially available are composite semipermeable membranes, and there are two types of composite semipermeable membranes, one having a separation functional layer in which a gel layer and a polymer are cross-linked on a microporous support membrane, and the other having a separation functional layer in which a monomer is polymerized on the microporous support membrane. Among them, a composite semipermeable membrane obtained by coating a microporous support membrane with a separation functional layer formed of a cross-linked polyamide obtained by a polycondensation reaction of a polyfunctional amine and a polyfunctional acid halide is widely used as a separation membrane having high water permeability and high selective separability.

It is well known that the crosslinked polyamide composite semipermeable membrane is deteriorated by an oxidizing agent such as free chlorine or a hypochlorite ion, and the selective separability is reduced. As a method for examining that the cause of deterioration is contact with the free chlorine or the like, Fujiwara test is widely used in which a deteriorated composite semipermeable membrane is reacted with an alkaline pyridine solution to confirm whether a color is present (see Non-Patent Literature 1).

NON-PATENT LITERATURE

Non-Patent Literature 1: Journal of Membrane Science, 2010, Vol. 347, P.159-164

SUMMARY OF THE INVENTION

Although the presence of a halogenated structure in the crosslinked polyamide can be easily confirmed by the Fujiwara test, there have been problems that the pyridine solution has an irritating odor and that it is difficult to confirm a color reaction in the case of a colored composite semipermeable membrane. Further, although a method for detecting a halogenated structure by an elemental analysis method such as X-ray photoelectron spectroscopy (XPS) is also partially used, since the method is a measurement operation in a specialized analysis institution, it takes time to obtain an analysis result and an expensive cost is required, and thus it is difficult for a person skilled in the art to generally use the method.

The present invention has been made in view of the above, and an object thereof is to provide a method for rapidly and easily analyzing the presence or absence of a halogenated structure in a composite semipermeable membrane.

In order to solve the above problems, the present invention is characterized by the following (1) to (9).

(1) A method for analyzing a composite semipermeable membrane, the method including:

a step A of immersing a composite semipermeable membrane in a solution including an alkali and at least one of a nicotinamide and a derivative thereof; and a step B of subjecting the solution obtained in the step A to fluorescence analysis.

(2) The method for analyzing a composite semipermeable membrane according to the above (1), in which the composite semipermeable membrane is a crosslinked polyamide composite semipermeable membrane.

(3) The method for analyzing a composite semipermeable membrane according to the above (1) or (2), in which the composite semipermeable membrane includes a separation functional layer, a microporous support layer, and a substrate, and a composite semipermeable membrane from which the substrate is removed is immersed in the solution in the step A.

(4) The method for analyzing a composite semipermeable membrane according to any one of the above (1) to (3), in which the alkali is sodium hydroxide or potassium hydroxide.

(5) The method for analyzing a composite semipermeable membrane according to any one of the above (1) to (4), in which an excitation wavelength and a fluorescence wavelength in the fluorescence analysis of the step B are in ranges of 360 nm to 380 nm and 450 nm to 470 nm, respectively.

(6) The method for analyzing a composite semipermeable membrane according to any one of the above (1) to (5), the method further including, between the step A and the step B, a step C of heating the solution in which the composite semipermeable membrane is immersed for a predetermined time.

(7) The method for analyzing a composite semipermeable membrane according to the above (6), in which a heating temperature is in a range of 50° C. to 90° C. and a heating time is in a range of 30 to 60 minutes in the step C.

(8) The method for analyzing a composite semipermeable membrane according to any one of the above (1) to (7), in which the separation functional layer of the composite semipermeable membrane has a yellowness index of 10 or more.

(9) The method for analyzing a composite semipermeable membrane according to any one of the above (1) to (8), in which in the fluorescence analysis of the step B, a degree of deterioration of the composite semipermeable membrane is calculated based on a fluorescence intensity of a peak top in ranges of the excitation wavelength of 360 nm to 380 nm and the fluorescence wavelength of 450 nm to 470 nm, or a peak integral value in ranges including at least the excitation wavelength of 360 nm to 380 nm and the fluorescence wavelength of 450 nm to 470 nm.

According to the present invention, it is possible to confirm the presence or absence of a halogenated structure even in a colored composite semipermeable membrane, which is difficult to determine in the related-art Fujiwara test. By using the analysis method of the present invention, reliable improvement of an operation of a water treatment plant based on a specification of a cause of deterioration is expected.

DETAILED DESCRIPTION OF EMBODIMENTS OF THE INVENTION

Hereinafter, a method for analyzing a composite semipermeable membrane according to the present invention will be described in detail.

The method for analyzing a composite semipermeable membrane of the present invention includes a step A of immersing the composite semipermeable membrane in a solution containing an alkali and at least one of a nicotinamide and a derivative thereof, and a step B of subjecting the solution obtained in the step A to fluorescence analysis.

(Analysis Target)

The shape and material of the composite semipermeable membrane to be subjected to the analysis method of the present invention are not particularly limited, and a composite material in which a separation functional layer is formed on a microporous support layer is exemplified. In particular, a composite semipermeable membrane containing a polyamide separation functional layer (hereinafter, also referred to as a "crosslinked polyamide composite semipermeable membrane"), which is currently widely used in various applications, is a main analysis target.

The composite semipermeable membrane has a "supply side surface" to which raw water is supplied and a "permeation side surface" opposite to the supply side surface, and has an asymmetric structure including three layers of the separation functional layer, the microporous support layer, and a substrate from a side close to the supply side surface toward the permeation side surface.

The substrate and the microporous support layer do not substantially show separation performance of ions or the like, and are for providing strength to the separation functional layer that controls the separation performance.

The material and shape of the substrate are not particularly limited, and examples thereof include fabric or unwoven fabric containing at least one selected from the group consisting of polyester and aromatic polyamide as a main component. Among them, polyester having high mechanical and thermal stability is preferably used. A thickness of the substrate is generally within a range of 10 to 200 μm in order to ensure dimensional stability.

The material and shape of the microporous support layer provided between the substrate and the separation functional layer are not particularly limited, and the microporous support layer generally has a porous structure having fine pores of about 0.1 nm to 100 nm on a surface on a side where the separation functional layer is formed, and is obtained, for example, by subjecting a polymer cast on the substrate to phase separation. As the material of the microporous support layer, various polymeric materials, such as polysulfone, polyethersulfone, polyphenylene sulfide sulfone, polyphenylene sulfone, and cellulose acetate are used alone or in combination. Among them, polysulfone that has high chemical, mechanical, and thermal stability and is easily molded is preferably used.

Various materials and structures have been developed as the separation functional layer that substantially exhibits the separation performance of ions or the like in the composite semipermeable membrane, the separation functional layer is not particularly limited, and examples thereof include thin membranes made of materials such as polyamide, cellulose acetate, graphene, polystyrene sulfonic acid, polyallylamine, and siloxane derivatives. Among them, a separation functional layer formed of a crosslinked polyamide thin membrane excellent in water permeability and selective separability (hereinafter, also referred to as a "crosslinked polyamide separation functional layer") is preferably used. The crosslinked polyamide separation functional layer is formed by a polycondensation reaction of a polyfunctional amine and a polyfunctional acid halide. A thickness of the separation functional layer is usually about 0.01 to 1 μm.

The composite semipermeable membrane may have other functional layers in addition to the separation functional layer, the microporous support layer, and the substrate as long as the desired separation function is not deteriorated, and thicknesses and lamination positions of the functional layers are not particularly limited.

In the analysis of the present invention, it is preferable to use a sufficiently washed composite semipermeable membrane except for unused products. When an analysis is performed in a state where a stain component is attached to the composite semipermeable membrane, it may be difficult to accurately analyze the deteriorated polyamide, which is the original purpose. Since the stain components adhering to the composite semipermeable membrane vary depending on a use environment, various chemicals are used for cleaning the composite semipermeable membrane, and the chemicals can be applied except those which cause chemical changes in the polyamide. Specific examples thereof include acidic chemicals such as hydrochloric acid, sulfuric acid and citric acid, alkaline chemicals such as sodium hydroxide and potassium hydroxide, surfactants such as sodium dodecyl sulfate and sodium polyoxyethylene lauryl sulfate, and chelating agents such as sodium ethylene diamine tetraacetate and sodium hexametaphosphate, and all of them can be preferably used. These chemicals may be used alone or in combinations of two or more thereof.

A conventionally known method may be adopted as the method for washing the composite semipermeable membrane with chemicals, and examples thereof include a method of immersing the composite semipermeable membrane in an aqueous solution of the chemicals and a method of passing the aqueous solution of the chemicals through the composite semipermeable membrane, but the method is not particularly limited thereto. A chemical concentration in the aqueous solution to be used can also be freely adjusted.

The composite semipermeable membrane used for analysis may be used as it is without being decomposed, but it is preferable to remove the substrate in advance. Since a hydrolyzable material such as polyester may be used as the substrate, there is a concern that the material may be mixed into an alkaline sample solution to reduce analysis accuracy. The substrate can be physically peeled off and removed by hand.

In commercially available composite semipermeable membranes, many of the separation functional layers are white to pale yellow, and some are yellow to orange. With respect to the composite semipermeable membrane having the separation functional layer with a yellowness index of 10 or more, it is difficult to perform the deterioration determination according to the presence or absence of a color in the related-art Fujiwara test, but the analysis method of the present invention can be applied to a composite semipermeable membrane having a yellowness index of 10 or more.

The yellowness index is a degree of separation of the hue of the polymer from colorless or white toward a yellow direction, and is defined by Japanese Industrial Standard JIS K 7373: 2006. The yellowness index of the separation functional layer can be measured using a color meter. The composite semipermeable membrane is placed on a glass plate so that a surface of the separation functional layer faces downward, and the microporous support layer is dissolved and removed with a solvent that dissolves only the microporous support layer, and then the yellowness index of the separation functional layer can be measured by measuring the transmission of a separation functional layer sample remaining on the glass plate. When the composite semipermeable membrane is placed on the glass plate, the substrate is preferably peeled off in advance. As the color meter, SM color computer "SM-7" manufactured by Suga Test Instruments Co., Ltd. can be used.

(Sample Preparation)

The method for analyzing a composite semipermeable membrane according to the present invention includes the step A of immersing the composite semipermeable membrane in the solution containing the alkali and at least one of the nicotinamide and the derivative thereof.

The nicotinamide and the derivative thereof may have a substituent on a carbamoyl group in the chemical structure thereof. Examples of the substituent on the carbamoyl group include a hydrogen atom; an alkyl group such as a methyl group, an ethyl group, a propyl group, an isopropyl group, a butyl group, and an isobutyl group; an alkenyl group such as a vinyl group, an allyl group, and a 3-butenyl group; and an aryl group such as a phenyl group, a methylphenyl group, a methoxyphenyl group, a chlorophenyl group, a fluorophenyl group, and a nitrophenyl group. The substitution position of the carbamoyl group on the pyridine ring may be any position of the 2-, 3-, or 4-position of the pyridine ring. The pyridine ring may have one to three substituents other than the carbamoyl group, and examples thereof include an alkyl group, an aryl group, an aralkyl group, an alkoxy group, and a carboxy group. Among the nicotinamide and the derivative thereof, nicotinamide is particularly preferable.

Examples of the alkali include hydroxides of alkali metals such as sodium hydroxide, potassium hydroxide, and lithium hydroxide; and hydroxides of alkali earth metals such as magnesium hydroxide and barium hydroxide. The alkali may be used alone or in combination of two or more. Among them, from the viewpoint of solubility in water, strong basicity, and the like, the alkali is preferably sodium hydroxide or potassium hydroxide.

The solution containing the alkali and at least one of the nicotinamide and the derivative thereof is prepared as an aqueous solution, but may be a mixed solution of water and a hydrophilic organic solvent such as methanol, ethanol, and 2-propanol. The solution concentration of the alkali and at least one of the nicotinamide and the derivative thereof is appropriately selected according to the solubility of each compound and a combination of the compounds, and is not particularly limited. The concentration of at least one of the nicotinamide and the derivative thereof is preferably 10 to 40 wt %, and more preferably 10 to 20 wt %. The concentration of the alkali is preferably 0.5 to 5 mol/L, and more preferably 0.5 to 3 mol/L.

The chemical liquid may contain other additives as long as the effects of the present invention are not impaired.

In the present invention, the composite semipermeable membrane is immersed in the solution containing the alkali and at least one of the nicotinamide and the derivative thereof. The immersion treatment may be performed at room temperature, but in order to promote the generation of fluorescent substances and increase the measurement accuracy of fluorescence intensity, a step C of performing heating for a predetermined time is preferably performed. A heating temperature in the step C is preferably 30 to 100° C., more preferably 50 to 90° C., and the heating time is preferably 30 to 60 minutes. In particular, the heating is preferably performed at 50 to 90° C. for 30 to 60 minutes.

(Fluorescence Analysis)

The present invention is characterized by including the step B of subjecting the sample solution obtained by immersing the composite semipermeable membrane to the fluorescence analysis. The fluorescence analysis is a type of spectroscopic analysis, and measures the wavelength and intensity of fluorescence emitted from the sample when light (excitation light) is radiated, and is performed based on the standard of JIS K 0120: 2005. The wavelength and intensity of the fluorescence can be measured using a general-purpose fluorescence analyzer, and for example, a fluorescence spectrophotometer "RF-5300PC" manufactured by Shimadzu Corporation is used. Since the fluorescence intensity is influenced by the temperature and decreases together with temperature rise, the heat-treated measurement sample is measured after being cooled to the room temperature (15 to 30° C.).

For example, when the crosslinked polyamide composite semipermeable membrane comes into contact with free chlorine or the like, chlorine is incorporated into the crosslinked polyamide to change the chemical structure thereof. By performing the measurement in ranges of an excitation wavelength of 220 to 600 nm and a fluorescence wavelength of 220 to 700 nm, a fluorescence peak derived from the composite semipermeable membrane deteriorated by the chlorine contact can be detected in ranges of the excitation wavelength of 360 to 380 nm and the fluorescence wavelength of 450 to 470 nm. In the present invention, five samples with the same conditions are prepared and analyzed, and an average value thereof is adopted as the analysis result.

Further, in the present invention, the degree of deterioration caused by chlorine can be calculated based on spectral data of the fluorescence analysis for the deteriorated composite semipermeable membrane. The amount of a polyamide structure deteriorated by chlorine can be quantified as the fluorescence intensity of a peak top in the ranges of the excitation wavelength of 360 to 380 nm and the fluorescence wavelength of 450 to 470 nm, or as a peak integral value in the ranges including at least the excitation wavelength of 360 to 380 nm and the fluorescence wavelength of 450 to 470 nm. For composite semipermeable membranes having various degrees of deterioration, by grasping a relationship between the values and the semipermeable membrane performance in advance, the degree of deterioration caused by chlorine can be calculated from a comparison between the semipermeable membrane performance predicted based on a peak top intensity or a peak integral value of a fluorescence spectrum and an actual semipermeable membrane performance even for a composite semipermeable membrane whose cause of deterioration is unknown. As items of the semipermeable membrane performance, it is possible to freely select a desalting rate or a membrane permeation flux under a certain condition.

When an unintended fluorescence peak is present in the obtained fluorescence spectrum, a main peak is analyzed after a sub-peak is removed by peak division processing. For the peak division, various commercially available processing software is used, or a simple division method of separating and removing the sub-peak at a base line is applied.

The ranges of the excitation wavelength and the fluorescence wavelength for calculating the peak integral value are ranges including at least the excitation wavelength of 360 to 380 nm and the fluorescence wavelength of 450 to 470 nm, preferably ranges including at least the excitation wavelength of 330 to 400 nm and the fluorescence wavelength of 430 to 510 nm, and more preferably ranges including at least the excitation wavelength of 320 to 405 nm and the fluorescence wavelength of 420 to 530 nm. A quantitative accuracy is improved by integrating the fluorescence intensity of the obtained fluorescence spectrum in a wider range.

EXAMPLES

Hereinafter, the present invention will be described in more detail with reference to Examples, but the present invention is not limited to these Examples.

An analysis procedure in the present invention is as follows.

Reference Example 1

An unused reverse osmosis membrane element ("TM720D-400" manufactured by Toray Industries, Inc., a crosslinked wholly aromatic polyamide-based composite semipermeable membrane was used) was disassembled, and the composite semipermeable membrane was cut into a 2 cm square and naturally dried at room temperature for 8 hours. After the substrate was peeled off and removed from the composite semipermeable membrane, the composite semipermeable membrane was placed on a slide glass such that a surface of the separation functional layer faced downward, and 20 mL of dichloromethane was applied little by little to dissolve and remove the microporous support layer. The yellowness index of the separation functional layer remaining on the glass plate was 18 as a result of measurement with SM color computer "SM-7" manufactured by Suga Test Instruments Co., Ltd.

Example 1

In a sample bottle, 9 g of a 3.0 mol/L aqueous sodium hydroxide solution was weighed, and then 1 g of the nicotinamide was added and dissolved to prepare a chemical liquid. A composite semipermeable membrane of 5 cm square was cut out from the unused reverse osmosis membrane element ("TM720D-400" manufactured by Toray Industries, Inc., a crosslinked wholly aromatic polyamide-based composite semipermeable membrane was used) and rinsed with distilled water to obtain a sample membrane. The sample membrane was immersed in a 10 mg/L aqueous solution of sodium hypochlorite at room temperature for 10 days to prepare a deteriorated sample membrane.

The obtained deteriorated sample membrane was immersed in the chemical liquid, heated at 90° C. for 30 minutes, and then cooled to the room temperature to prepare the sample solution. The sample solution was transferred to an analysis cell, and the fluorescence intensity was measured by a three-dimensional spectrum measurement method using the fluorescence spectrophotometer "RF-5300PC" (manufactured by Shimadzu Corporation). Measurement conditions were set in the ranges of the excitation wavelength of 220 to 600 nm (data interval: 5 nm) and the fluorescence wavelength of 220 to 700 nm (1 nm). The test was performed on five sample membranes to obtain the average value.

As a result, fluorescence having a wavelength of 460 nm and a relative intensity of 320 was observed under the condition of an excitation wavelength of 365 nm.

Example 2

The sample solution was prepared and the fluorescence intensity was measured in the same manner as in Example 1 except that the deterioration treatment with the aqueous solution of sodium hypochlorite was omitted. As a result, it was confirmed that fluorescence was not observed.

From the comparison between Example 1 and Example 2, the presence of the halogenated structure in the composite semipermeable membrane deteriorated by the hypochlorite ion could be detected by the analysis method of the present invention.

Example 3

The sample solution was prepared and the fluorescence intensity was measured in the same manner as in Example 1, except that a white (yellowness index: 5) composite semipermeable membrane of 5 cm square was cut out from the unused reverse osmosis membrane element ("TM 720C-400" manufactured by Toray Industries, Inc., a cross-linked wholly aromatic polyamide-based composite semipermeable membrane was used), rinsed with distilled water, followed by peeling off and removing the substrate to obtain the sample membrane. As a result, fluorescence having the wavelength of 460 nm and a relative intensity of 317 was observed under the condition of the excitation wavelength of 365 nm.

Comparative Example 1

The deteriorated sample membrane prepared in Example 1 was evaluated by the Fujiwara test. In a sample bottle, 9 g of a 3.0 mol/L aqueous sodium hydroxide solution was weighed, and then 1 g of pyridine was added to prepare a chemical liquid. A deteriorated sample membrane similar to that of Example 1 was immersed in the chemical liquid, and as a result, the chemical liquid was colored reddish-brown.

Comparative Example 2

The Fujiwara test was performed in the same manner as in Comparative Example 1 except that the deterioration treatment with the aqueous solution of sodium hypochlorite was omitted. As a result, the chemical liquid was colored brown.

It is presumed that the coloring of the chemical liquid in Comparative Example 2 using the un-deteriorated membrane is caused by the elution of the colored component from the composite semipermeable membrane, and is not caused by the original color reaction of the Fujiwara test.

In the comparison between Comparative Example 1 and Comparative Example 2, it was difficult to determine the difference in color.

As described above, by using the analysis method of the present invention, it is possible to confirm the presence of the halogenated structure in the colored reverse osmosis membrane, which has been difficult to determine in the related-art Fujiwara test, and to quantify by the fluorescence intensity. The analysis method of the present invention is a simple method that is not based on elemental analysis, and therefore has high versatility.

Although the present invention has been described in detail with reference to specific embodiments, it is apparent to those skilled in the art that various changes and modifications may be made without departing from the spirit and scope of the present invention.

According to the present invention, it is possible to quickly and easily analyze a halogenated structure of a composite semipermeable membrane deteriorated by free chlorine, a hypochlorite ion, or the like, and therefore, the present invention is useful for elucidation of the cause of performance deterioration in a water treatment plant and improvement in operation.

The invention claimed is:

1. A method for analyzing a composite semipermeable membrane, the method comprising:

a step A of immersing a composite semipermeable membrane in a solution comprising an alkali and at least one of a nicotinamide and a derivative thereof;

a step B of subjecting the solution to fluorescence analysis after the step A; and between the step A and the step B, a step C of heating the solution, wherein a heating temperature is in a range of 50° C. to 90° C. and a heating time is in a range of 30 to 60 minutes in the step C.

2. The method for analyzing a composite semipermeable membrane according to claim 1, wherein the composite semipermeable membrane is a crosslinked polyamide composite semipermeable membrane.

3. The method for analyzing a composite semipermeable membrane according to claim 1, wherein the composite semipermeable membrane comprises a separation functional layer, a microporous support layer, and a substrate, and a the composite semipermeable membrane is immersed in the solution in the step A after the substrate is removed.

4. The method for analyzing a composite semipermeable membrane according to claim 1, wherein the alkali is sodium hydroxide or potassium hydroxide.

5. The method for analyzing a composite semipermeable membrane according to claim 1, wherein an excitation wavelength and a fluorescence wavelength in the fluorescence analysis of the step B are in ranges of 360 nm to 380 nm and 450 nm to 470 nm, respectively.

6. The method for analyzing a composite semipermeable membrane according to claim 1, wherein the a separation functional layer of the composite semipermeable membrane has a yellowness index of 10 or more.

7. The method for analyzing a composite semipermeable membrane according to claim 1, wherein in the fluorescence analysis of the step B, a degree of deterioration of the composite semipermeable membrane is calculated based on a fluorescence intensity of a peak top in ranges of the excitation wavelength of 360 nm to 380 nm and the fluorescence wavelength of 450 nm to 470 nm, or a peak integral value in ranges including at least the excitation wavelength of 360 nm to 380 nm and the fluorescence wavelength of 450 nm to 470 nm.

* * * * *